United States Patent
Wiggins, Jr.

[11] Patent Number: 6,022,049
[45] Date of Patent: Feb. 8, 2000

[54] GO-KART CHASSIS FORMED FROM TUBULAR SECTIONS

[75] Inventor: Harrill Wiggins, Jr., China Grove, N.C.

[73] Assignee: Wiggins Kart Skop, Inc., China Grove, N.C.

[21] Appl. No.: 09/015,235

[22] Filed: Jan. 29, 1998

[51] Int. Cl.[7] .................................................. B62D 21/02
[52] U.S. Cl. ........................................... 280/796; 280/798
[58] Field of Search ..................................... 280/781, 796, 280/798; 180/311, 908

[56] References Cited

U.S. PATENT DOCUMENTS

| | | |
|---|---|---|
| 2,253,193 | 8/1941 | Niessen . |
| 2,918,981 | 12/1959 | Rupp, II . |
| 2,919,139 | 12/1959 | Rupp, II . |
| 3,022,846 | 2/1962 | Thompson . |
| 3,115,350 | 12/1963 | Quick, Jr. . |
| 3,557,894 | 1/1971 | Hanley . |
| 3,799,283 | 3/1974 | Freber . |
| 3,829,117 | 8/1974 | Park . |
| 4,623,167 | 11/1986 | Matsubayashi et al. . |
| 4,629,023 | 12/1986 | Carpanelli et al. . |
| 4,682,668 | 7/1987 | Salmon et al. . |
| 4,732,819 | 3/1988 | Komuro . |
| 4,798,400 | 1/1989 | Kosuge . |
| 4,799,708 | 1/1989 | Handa et al. . |
| 5,094,313 | 3/1992 | Mauws . |
| 5,265,690 | 11/1993 | Amundsen et al. . |
| 5,307,890 | 5/1994 | Huang . |
| 5,495,905 | 3/1996 | Fini, Jr. . |

OTHER PUBLICATIONS

World Karting, Dec. 1996, vol. 27, No. 12.
"The Ultimate Racing Chassis", World Karting, (Dec. 1996), vol. 27, No. 12.

*Primary Examiner*—Christopher Bottorff
*Attorney, Agent, or Firm*—Kennedy Covington Lobdell & Hickman

[57] ABSTRACT

An oval-track racing go-kart chassis includes two longitudinally extending tubular side members having a first cross-sectional diameter of 1.25 inches and three transversely extending tubular members having a second cross-sectional diameter of 1.125 inches, the transversely extending members connecting the longitudinally extending members together to form the chassis.

7 Claims, 2 Drawing Sheets

GO-KART CHASSIS FORMED FROM TUBULAR SECTIONS

FIELD OF THE PRESENT INVENTION

The present invention relates to a go-kart chassis and, in particular, to a go-kart chassis formed from tubular sections and designed for oval-track racing.

BACKGROUND OF THE PRESENT INVENTION

Chassis flexibility is a critical feature of a chassis of a go-kart used in oval-track racing, a sport commonly enjoyed in the United States. Go-karts having flexible chassis are better able to maintain both rear wheels on the track surface through corners at high speeds compared to go-karts having more inflexible chassis. The retention of both wheels on the track surface is important because racing go-karts have live rear wheel axles.

Chassis for racing go-karts are generally constructed from sections of tubing which are welded together to define a frame. Typically all the tubular sections of the chassis are formed from 1.125 inch tubing and, until the present innovation, this dimension was adopted de facto as an industry standard in oval-track racing. A few manufacturers have formed all of the tubular sections of a chassis from 1.25 inch tubing, but such a chassis has been found to exhibit a high degree of inflexibility, i.e., lack of roll in cornering, and consequently a driver of a go-kart having a chassis formed from 1.25 inch tubing has found himself at a disadvantage to his competitors. Racing go-karts built with the 1.125 inch tubular chassis have thus exhibited a competitive edge and therefore enjoyed unsurpassed commercial success in the oval-track racing industry over the few racing go-karts built with the 1.25 inch tubular chassis.

In Europe, go-kart race tracks generally include hairpin turns and are not oval, and when racing on these tracks it is more advantageous to use an inflexible chassis with minimized roll in cornering. Go-karts used in European style racing therefore are typically formed from 32 millimeter tubular sections (approx. 1.26 inch tubing), and go-karts utilizing the 1.125 inch tubular sections exhibit substandard racing performance. A modification to this conventional European style chassis includes using front and middle transversely extending tubular members formed from 35 millimeter tubing which tends to reduce the flexibility of the chassis even more in cornering.

Various types of chassis for different types of go-karts are well-known and disclosed, for example, by the following U.S. Pat. Nos.: 4,799,708; 4,732,819; 4,682,668; 4,629,023; 3,829,117; 3,799,283; 3,557,894; 3,115,350; 3,022,846; 2,919,981; and 2,919,139.

A particular go-kart chassis that has enjoyed wide acceptance in the oval-track racing industry is disclosed by Amundsen et al., U.S. Pat. No. 5,265,690, which is incorporated herein by reference. The chassis shown in FIG. 1 thereof is formed from 1.125 inch tubing, see Amundsen et al., col. 1, lines 31–32, and includes two tubular side members (12,14) which longitudinally extend the length of the go-kart chassis with front, middle, and rear tubular transversely extending members (16,18,20) extending therebetween. A flat bar (21) is also secured between the side members (12,14) for supporting a floor board, and a further tubular member (24) extends parallel to part of the side member (12) towards the rear of the chassis for supporting a motor. Furthermore, the motor supporting member (24) is welded to the rear transversely extending member (20) and to the side member (12), and the front and rear transversely extending members (16,20) are welded to the side members (12,14). The middle transversely extending member is welded to the side member (14) and to the motor supporting member (24).

Another oval-track racing chassis that has enjoyed much success in the oval-track racing industry is disclosed in FIG. 1 herein and has also been completely formed from 1.125 inch tubing. In particular, two tubular side members 102,104 longitudinally extend the length of the go-kart chassis and front, middle, and rear tubular transversely extending members 106,108,110 extend therebetween. A motor supporting tubular member 112 extends parallel to part of side member 102 towards the rear of the chassis and also includes at one end a perpendicular section 114 formed integral therewith which is secured to the side member 102. The motor supporting member 112 is secured at its opposite end to an intermediate tubular member 116 which extends between and is welded to the side member 102 and the middle transverse member 108. The middle and front transversely extending members 108,106 are welded to the two side members 102,104, and the rear transverse member 110 is welded to the side member 104 and the motor supporting member 112.

While improvements have been made over the years to go-karts as disclosed in the above-identified patents, for example, further refinements and innovations leading to an additional competitive edge is always needed to insure successful oval-track racing. The present invention is designed to provide such a desired and necessary competitive edge.

BRIEF SUMMARY OF THE PRESENT INVENTION

In particular, the present invention represents a competitive edge over prior go-kart chassis because of an improved acceleration achieved with the present invention immediately following cornering without the loss of flexibility in the cornering. Indeed, following the introduction of the go-kart chassis of the present invention at a trade show in February of 1997, the competitive edge resulting from the present invention was immediately recognized by and widely copied in the oval-track racing industry, which event has prompted the present need for immediate patent protection.

Briefly summarized, the present invention relates to a novel and unobvious combination of 1.125 inch tubing and 1.25 inch tubing in the chassis of an oval-track racing go-kart. Specifically, the present invention includes a go-kart chassis used in oval-track racing comprising longitudinally extending members having a first cross-sectional dimension; and transversely extending members having a second cross-sectional dimension and connecting the longitudinally extending members together to form the oval-track racing go-kart chassis, the first cross-sectional dimension being greater than the second cross-sectional dimension.

In a feature of the present invention the longitudinally extending members are cylindrical and in another feature the transversely extending members are cylindrical. In yet another feature the members reside in a common plane, and in yet another feature the members are welded together to form the chassis.

In the preferred embodiment, the oval-track racing go-kart chassis includes: (a) first and second side members formed from tubing having a first diameter and longitudinally extending front-to-rear along the length of the go-kart chassis to define the sides thereof; (b) a motor supporting member formed from tubing having the first diameter and extending partially along and adjacent the inside rear of the first side member; (c) a front transversely extending member formed from tubing having a second diameter less than the first diameter and connecting a front end of the first side member to a front end of the second side member; (d) a rear transversely extending member formed from tubing having the second diameter and connecting the second side member to the motor supporting member; (e) a middle transversely extending member formed from tubing having the second diameter and connecting the first and the second side members together; and (f) an intermediate member formed from tubing having the second diameter and connecting the first side member to the motor supporting member to the middle transversely extending member. Preferably the first diameter is 1.25 inches and the second diameter is 1.125 inches.

BRIEF DESCRIPTION OF THE DRAWINGS

Other objects, aspects, features and advantages of the present invention will become apparent to those having ordinary skill in the art from the following detailed description of the preferred embodiment taken in conjunction with the drawings, wherein.

DETAILED DESCRIPTION OF THE PREFERRED EMBODIMENT

The preferred racing go-kart chassis of the present invention will now be described in detail with reference to FIG. 2.

Generally, the racing go-kart chassis is formed from tubular sections of steel with one group of tubular sections being formed from tubing having a cross-sectional dimension, e.g., diameter, of 1.25 inches, and another group of tubular sections being formed from tubing having a cross-sectional dimension of 1.125 inches. The tubular sections are welded together and reside in a common plane to form the go-kart chassis with a conventional welding machine, which process is well known to one having ordinary skill in the art.

Figure 1:
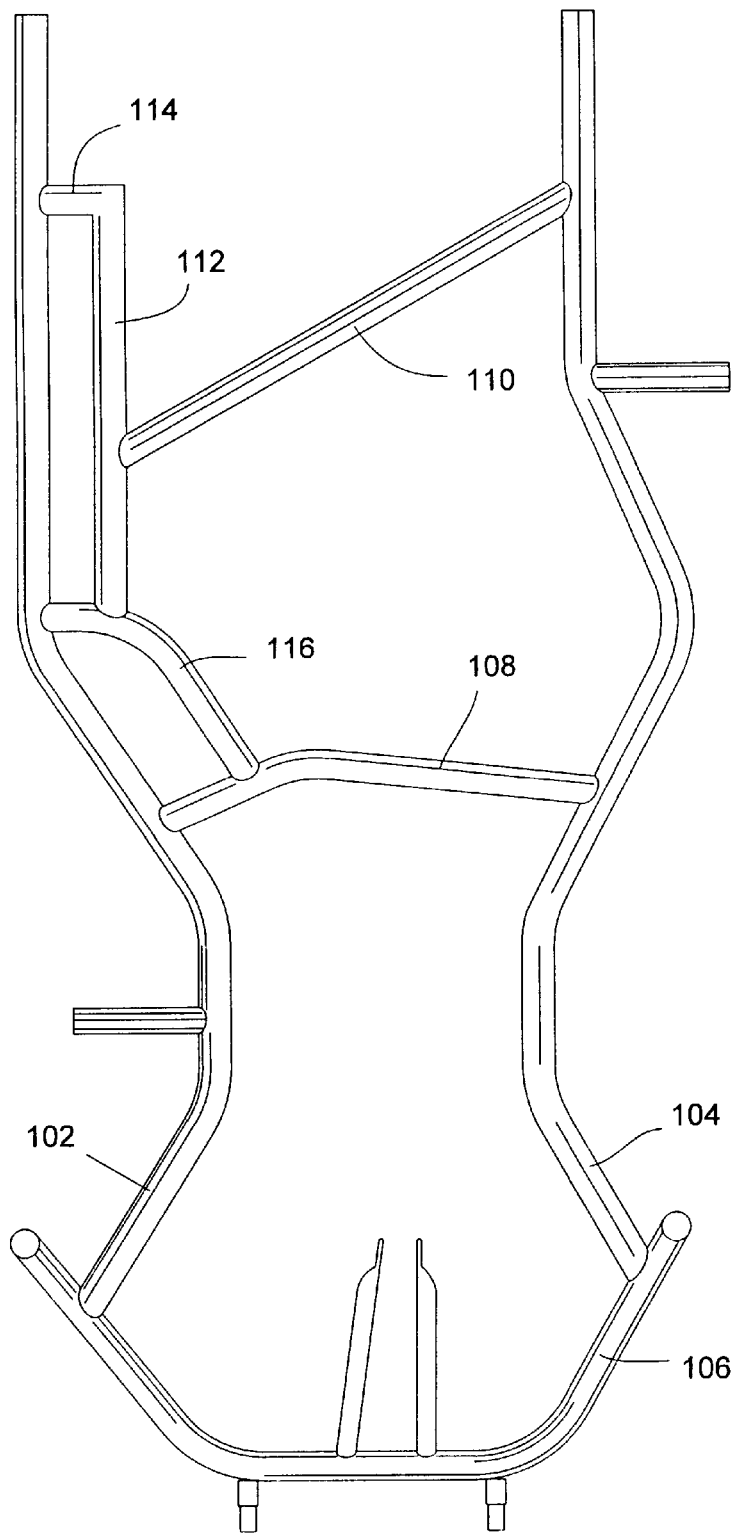
FIG. 1 is a top plan view of a go-kart chassis of the prior art in which all tubular sections are formed from 1.125 inch tubing.
Figure 2:
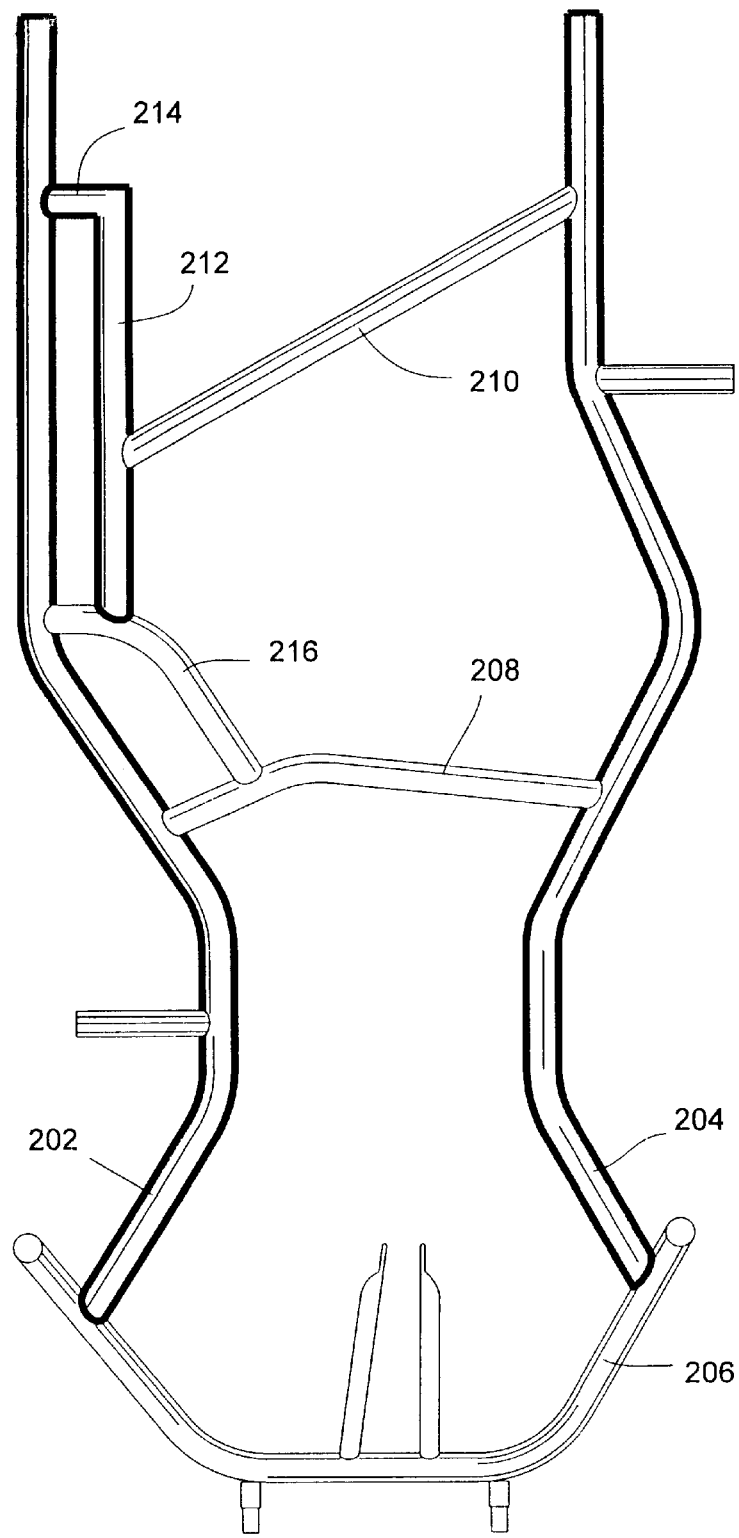
FIG. 2 is a top plan view of the preferred embodiment of a go-kart chassis including tubular sections formed from 1.125 inch tubing and 1.25 inch tubing in accordance with the present invention.

The group of tubular sections formed from 1.25 inch tubing preferably includes the side members 202,204 and the motor supporting member 212, each of which is shown in bold in FIG. 2. These members are preferably formed from the 1.25 inch tubing because of their tendency to extend generally longitudinally with regard to the go-kart chassis, which consequently reinforces the front-to-rear rigidity of the go-kart chassis. It has been found by testing that this improved lengthwise rigidity of the chassis not enjoyed by standard oval-track racing go-karts improves the acceleration experienced immediately following cornering, thereby allowing the go-kart of the present invention to pull away from the pack.

The group of tubular sections formed from 1.125 inch tubing preferably includes the front, middle, and rear transversely extending members 206,208,210 as well as the intermediate member 216. It has been found that use of the 1.125 tubing for transversely extending members preserves the side-to-side flexibility exhibited by conventional go-kart chassis for maintaining conventional performance during cornering.

With particular regard to the connection of the tubular members of the preferred go-kart chassis of the present invention, two tubular side members 202,204 longitudinally extend the length of the go-kart chassis front-to-back to form the sides of the go-kart chassis. Front, middle, and rear tubular transversely extending members 206,208,210 extend therebetween. A motor supporting tubular member 212 extends parallel to part of side member 202 towards the rear of the chassis. The motor supporting member 212 also includes at one end a perpendicular section 214 formed integral therewith which is secured to the side member 202, and the motor supporting member 212 is secured at its opposite end to an intermediate tubular member 216. This intermediate member 216 extends between and is welded to the side member 202 and the middle transversely extending member 208. The middle and front transversely extending members 208,206 are welded to the two side members 202,204, and the rear transversely extending member 210 is welded to the side member 204 and to the motor supporting member 212.

As previously noted, the new and unobvious combination of 1.25 inch tubing and 1.125 inch tubing of the present invention yields a significant competitive advantage in oval-track racing not heretofore recognized in the go-kart racing industry as evidenced by the widespread copying that has occurred following the commercial introduction of the preferred go-kart chassis of the present invention in February of 1997.

It will therefore be readily understood by those persons skilled in the art that the present invention is susceptible of a broad utility and application. Many embodiments and adaptations of the present invention other than those herein described will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention, the present invention being limited only by the claims appended hereto and equivalents thereof.

What is claimed is:

1. An offset go-kart chassis used in oval-track racing consisting of:

two longitudinally extending members having a cylindrical first cross section dimension of approximately 1.25 inches in diameter, said two longitudinally extending members defining opposed sides of said go-kart chassis along a length there a third member extending longitudinally along a portion of and in proximity to one of said two longitudinally extending members, said third member and said portion of said one of said two longitudinally extending members forming a motor mounting location; and four members having a cylindrical second cross-sectional dimension of approximately 1.125 inches in diameter and connecting said longitudinally extending members together to form said offset go-kart chassis.

2. The go-kart chassis according to claim 1, wherein all of said members forming said go-kart chassis generally reside in a common plane.

3. A go-kart chassis according to claim 2, wherein said members are welded together.

4. An offset go-kart chassis used in oval-track racing, comprising first and second side members formed from a cylindrical tubing having a first diameter of approximately 1.25 inches and longitudinally extending front-to-rear of said go-kart chassis to define sides thereof; and a plurality of members formed from a cylindrical tubing having a second diameter of approximately 1.125 inches and extending between said first and second side members to connect said first and second side members together.

5. A go-kart chassis according to claim 4, wherein said first and second side members and said plurality of members reside in a common plane.

6. The go-kart chassis according to claim 4, wherein said first and second side members and said plurality of members are welded together to form said go-kart chassis.

7. An offset go-kart chassis used in oval-track-go-kart racing, comprising:

(a) first and second side members formed from circular tubing having a first diameter of approximately 1.25 inches and longitudinally extending along a length of the go-kart chassis;

(b) a motor supporting member formed from circular tubing having said first diameter and extending partially alongside and in proximity to said first side member, said motor supporting member and the portion of said first side member forming a motor mounting location;

(c) a front transversely extending member formed from circular tubing having a second diameter of approximately 1.125 inches and connecting a front end of said first side member to a front end of said second side member;

(d) a rear transversely extending member formed from circular tubing having said second diameter and connecting said second side member to said motor supporting member;

(e) a middle transversely extending member formed from circular tubing having said second diameter and connecting said first and second side members together; and (f) an intermediate member formed from circular tubing having said second diameter and connecting said first side member to said motor supporting member to middle transversely extending member.

* * * * *